United States Patent [19]

Ittemann et al.

[11] Patent Number: 4,873,284

[45] Date of Patent: Oct. 10, 1989

[54] HEAT-CURABLE MOLDING COMPOSITIONS

[75] Inventors: Peter Ittemann, Ludwigshafen; Philipp Eisenbarth, Bad Duerkheim, both of Fed. Rep. of Germany

[73] Assignee: BASF Aktiengesellschaft, Ludwigshafen, Fed. Rep. of Germany

[21] Appl. No.: 146,232

[22] Filed: Jan. 20, 1988

[30] Foreign Application Priority Data

Jan. 23, 1987 [DE] Fed. Rep. of Germany ....... 3701900

[51] Int. Cl.$^4$ .......................... C08K 7/06; C08K 7/14; C08L 33/24; C08L 49/00
[52] U.S. Cl. ..................................... 524/548; 524/550; 525/185; 525/189; 525/190; 526/262; 526/285; 526/286; 526/313; 526/316

[58] Field of Search ......... 524/548, 602, 550; 528/322; 526/260, 285, 286, 313, 316; 525/419, 420, 190, 189; 566/185

[56] References Cited

U.S. PATENT DOCUMENTS

| | | | |
|---|---|---|---|
| 4,100,140 | 7/1978 | Zahir et al. | 526/180 |
| 4,526,925 | 7/1985 | Parker et al. | 524/548 |
| 4,598,007 | 7/1986 | Kourtides et al. | 428/921 |
| 4,608,426 | 8/1986 | Stern | 526/262 |
| 4,647,616 | 3/1987 | Swearingen et al. | 524/600 |
| 4,736,035 | 4/1988 | Puckett | 524/789 |
| 4,743,647 | 5/1988 | Domeier | 526/262 |
| 4,789,704 | 12/1988 | Stenzanberger et al. | 526/262 |

*Primary Examiner*—Allan M. Lieberman
*Attorney, Agent, or Firm*—William G. Conger

[57] ABSTRACT

Bismaleimide resin systems containing a bismaleimide and a multinuclear alkenyl and/or alkynyl arene as comonomers have improved toughness while maintaining high glass transition temperatures.

5 Claims, No Drawings

HEAT-CURABLE MOLDING COMPOSITIONS

BACKGROUND OF THE INVENTION

1. Field of the Invention

The invention relates to heat-curable molding compositions based on bismaleimide resins. More particularly, the invention relates to improved bismaleimide resin compositions having improved toughness without sacrificing thermal stability.

2. Background of the Invention

Bismaleimide resins, which also contain aromatic diamines as comonomers as disclosed in Federal Republic of Germany Patent 1 770 867 demonstrate excellent mechanical and electrical properties after thermal curing at temperatures in excess of 200° C. However, the monomers have limited solubility in ordinary solvents and the cured products are very brittle. Maleimide resins containing polyphenols as comonomers according to Federal Republic of Germany published application 2 459 925 demonstrate insufficient toughness.

An improvement in toughness may be achieved by using binuclear allylphenols or allylphenol esters, as described, for example, in U.S. Pat. No. 4,100,140. However, these comonomers show a relatively low fusion viscosity creating difficulties when impregnating reinforcing fibers as is commonly done in the preparation of fiber-reinforced prepregs. As a result of the relatively large proportion of aliphatic structural elements, these resins do not possess sufficient thermal-oxidative stability for certain applications.

SUMMARY OF THE INVENTION

The object of the invention is to make available bismaleimide resins which do not demonstrate the aforesaid disadvantages. This and other objectives are met by the resins of this invention, which contain polycyclic comonomers. They possess good solubility, a favorable fusion viscosity and, in turn, good impregnating ability. Cured molding compositions exhibit good resistance to heat, favorable toughness and low water absorption.

It is necessary that the comonomers used according to the process of this invention are more than binuclear compounds and/or mixtures of compounds and that they at least possess two alkenyl and/or alkynyl groups R, preferably allyl (R is $CH_2=CH-CH_2-$), propenyl (R is $CH_3-CH=CH_2-$), or alkynyl (R is $CH\equiv C-CH_2-$) groups.

Preferred alkenyl and/or alkynyl arenes A and B, as disclosed in the formula which follows, are those which contain five or more aryl rings. Resins containing biphenyl groups, in which m=2, provide cured molded articles having particularly high thermal dimensional stability and stiffness. Moreover, comonomers containing carbonyl groups are preferred over those having sulfonyl groups, since the former result in molding compositions having less water adsorption.

The alkenyl and/or alkynyl arenes A are able to be prepared by the reaction of difunctional aromatic compounds having the following structural formula:

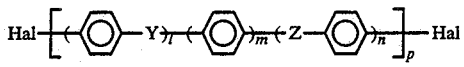

with monoalkenyl and/or monoalkynylphenols having the formula

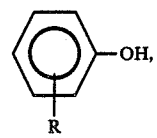

whereby the symbols have the following meanings:
X, Y, Z, and Q can be CO, $SO_2$, O, $CH_2O$ or $C(R^1)_2$, wherein $R^1$ is a $C_1$-$C_6$-alkyl radical; wherein l and n can be 0 or 1; wherein m can be 1 or 2; wherein p can be a whole number between 1 and 10; wherein

is a benzene ring, which can also be optionally substituted by $C_1$-$C_6$ alkyl-, alkoxy-, aryl-, halogen or nitro groups; wherein R is an alkenyl or alkynyl radical having from 2 to 6 carbon atoms; and wherein compound (A) contains at least five aromatic nuclei.

Typical monoalkenylphenols are, for example, 2-allylphenol, 2-propenylphenol, eugenol, isoeugenol, vinylphenol, propargylphenol, and ethynylphenol.

Preferred dihalogen compounds are:

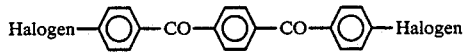

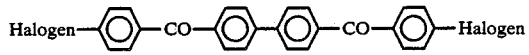

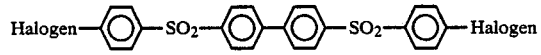

wherein Halogen=F or Cl and the phenyl rings are otherwise unsubstituted.

Also suitable are:

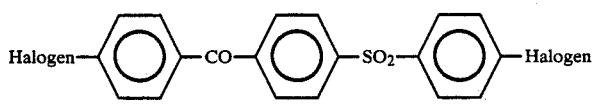

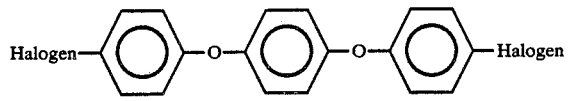

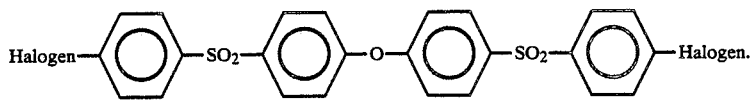

This last named group, for example, after reaction with an alkenylphenol, results in a Comonomer A in which n=0 and p=2.

The reaction preferably takes place at temperatures between 140° and 220° C. in a suitable solvent, for example, dimethylformamide, dimethylacetamide, N-methylpyrrolidone or dimethylsulfoxide, in the presence of a base, for example, potassium carbonate. Isolating the product occurs by ordinary extraction and distilling off of the solvent. A peculiarity here should be pointed out: when using 2-alkenylphenols, generally 1-alkenyl arenes are obtained, since under the basic reaction conditions isomerization of the double bonds takes place. The 1-alkenyl arenes can also be present as cis- or trans-isomeric mixtures.

The alkenyl and/or alkynyl arenes B can be prepared by the reaction of bisphenols with alkenyl and/or alkynyl halides, as for example described in Federal Republic of Germany published application 28 18 091.

Preferred bisphenols are:

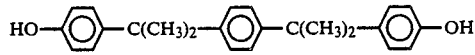

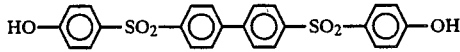

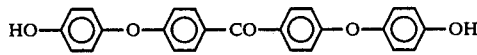

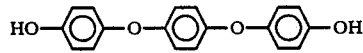

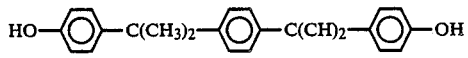

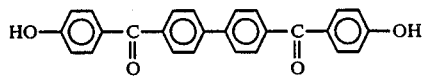

Also suitable are:

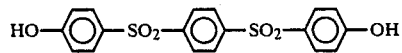

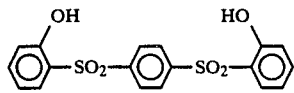

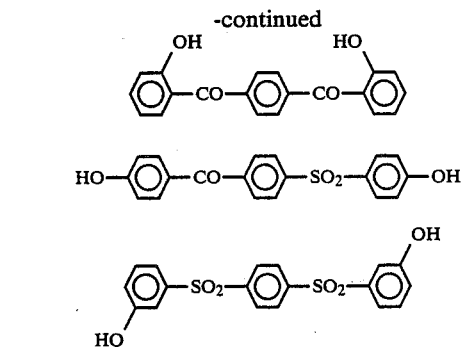

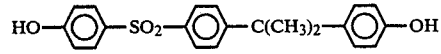

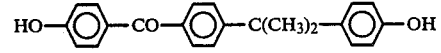

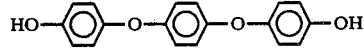

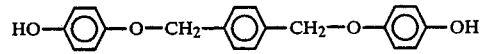

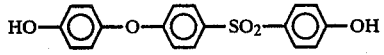

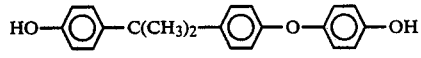

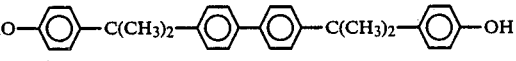

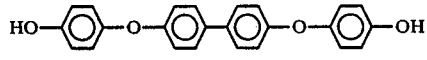

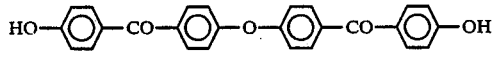

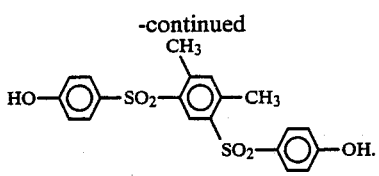

Preferred alkenyl halides are allyl chloride, allyl bromide, methallyl chloride, and propargyl chloride. Most preferred is allyl chloride.

Alkylating the bisphenols generally first provides the corresponding O-alkenylphenol ethers, which subsequently may be subjected to a Claisen-rearrangement, forming the alkenyl arenes as disclosed in Federal Republic of Germany published application 28 18 091. The 2-alkenyl arenes obtained in this fashion are able to be subsequently converted into the corresponding 1-alkenyl arenes, for example according to European published application EP-A 14 816.

The bismaleimide resins useful in the practice of the subject invention are obtained by the reaction of alkenyl and/or alkynyl arenes with a bismaleimide having the general formula:

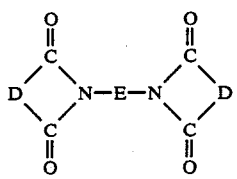

in which D is an optionally substituted hydrocarbon double bond and E is a doubly valent radical having at least two carbon atoms. Bismaleimides are disclosed, for example, in Federal Republic of Germany published applications 2 040 094, 2 719 903 and 3 247 058. In addition to bismaleimides, also suitable are polymaleimides as well as mixtures of different bismaleimides. Preferred bismaleimides are: 4,4'-bismaleimidodiphenylmethane, 4,4'-bismaleimidodiphenylether, 3,3'-bismaleimidodiphenylsulfone, 2,4'-bismaleimidotoluene, 1,6-bismaleimidohexane and 2,4,4-trimethyl-1,6-bismaleimidohexane. They may also be composed of up to 20 weight percent of a monoimide.

One can adjust the stoichiometry of the reaction between the bismaleimide and the alkenyl and/or alkynyl arenes over a wide range. An equivalent ratio of from 1 to 0.5—5 is preferred. In addition to the presumably radically initiated copolymerization, reactions of the addition type may also occur, for example, Ene-reactions and Diels-Alder-reactions. Depending on the intended application, it may be advantageous to add additional components to the resin. Examples are ordinary epoxy resins or vinylester resins.

Other additives which can be used are amines, preferably aromatic diamines, for example, 4,4'-diaminodiphenylmethane, and aminophenols. These additives are also able to enter into an addition reaction with the maleimide double bonds. Prepolymers can also be employed, for example, from a bisimide and an amine.

For certain applications, it may be effective to employ vinyl monomers for adjusting the desired viscosity. Typical vinyl monomers are, for example, styrene, a-methylstyrene, divinylbenzene, acrylic esters or methacrylic esters, diallylphthalate, 3,3'-diallylbisphenol A, triallylisocyanurate, triallylcyanurate and N-vinylpyrrolidone. They may be present in amounts of up to about 50 weight percent, based on the weight of the total composition.

The resin compositions can also contain catalysts and inhibitors as additional additives. Typical catalysts are tertiary amines, imidazoles, organic acids, phosphines, and peroxides. Cited as inhibitors are phenothiazine, various hydroquinones, and benzoquinone. The quantity of catalyst or inhibitor used should be between about 0.05 and 1.5 weight percent.

The resin compositions can also contain other additives common to the technology of curable plastics, like fillers, plasticizers, pigments, colorants, mold release agents, and flame retardants. Used as fillers are glass and carbon fibers, graphite powder, mica, quartz powder, kaolin or metal powder, up to a proportion of 80 weight percent based on the resin composition.

The resin compositions are able to be employed as impregnating resins, casting resins, laminating resins or as filled or unfilled molding compositions. The resin systems are particularly useful as matrix resins in the preparation of fiber reinforced prepregs containing, for example, glass, carbon/graphite, and aramid fibers, or fibers of polymers containing aryl groups connected by carbonyl, ether, isoalkylidene and sulfone linkages, as disclosed in U.S. Pat. No. 4,175,175.

If they are to serve in the preparation of high performance composites, then the impregnation of unidirectional or woven glass, carbon/graphite, aramid or other fibers may take place either in the melt at 50° to 150° C., or in solution. Typical solvents are halogenated hydrocarbons, for example, dichloromethane; ketones such as acetone or methylethylketone; glycol esters; toluene; dimethylformamide; N-methylpyrrolidone; and mixtures of several solvents.

When preparing the bismaleimide resins, the starting materials are mixed together using ordinary techniques and heated to temperatures between 70° to 90° C., whereby the formation of a prepolymer may take place. Depending upon the nature of the resins, and the degree of advancement of the prepolymerization process, one may obtain a highly viscous melt or a glass-like solid which, depending on the application, may be ground, or dissolved in a solvent. The preparation of the resins may also take place in one of the aforesaid solvents.

Curing the resins occurs at temperatures of about from 100° to 300° C., optionally under pressure, preferably between 160° to 260° C. The selected curing temperature is dependent upon the length of the curing time and vice versa. Frequently, step-wise curing is advantageous, crosslinking being induced first while molding at lower temperatures, followed, after demolding, by a post cure for several hours at a temperature above 200° C.

High performance composites, insulating material, structural components, equipment casings and electrical structural components which withstand high temperatures are able to be prepared from the resins.

EXAMPLE 1

(a) Preparing an Alkenylarene of Type A (X, Q=O; Y, Z=SO₂; l, n=1; m=2; R=Propenyl; p=1)

To 600 ml of N-methylpyrrolidone (NMP) and 100 ml of chlorobenzene was added 83.1 grams (0.165 mole) of 4,4'-bis(4-(chlorophenylsulfonyl))biphenyl, 44.35 grams (0.33 mole) of 2-allylphenol and 25.12 grams of potassium carbonate. The reaction mixture was heated to 190° C. for 4 hours with constant stirring and the water produced during the course of the reaction removed as an azeotrope via a nitrogen stream. The reaction mixture was then poured into 5 liters of water and the organic phase separated. The aqueous phase was extracted twice with a total of 2 liters of dichloromethane. The combined organic phases were subsequently washed in a liquid/liquid-extractor using water, then dried and concentrated in vacuo. Obtained was 71 grams (64 percent) of an alkenylarene having a softening point of 95° C. (Koflerbank); $^1$H-NMR (270 MHz, D$_6$-DMSO); 1.72 (d, 6H), 5.70–5.80 (m), 6.25–6.42 (m, 6H), 7.20–7.40 (m, 4H), 7.60–7.80 (m, 2H), 7.90–8.15 (m, 12H).

(b) Preparing a Bismaleimide Resin System

Into a stirred reaction vessel, maintained at a temperature of 170° C., were introduced 20 grams of the alkenylarene of 1a, 80 grams of 4,4'-bismaleimidodiphenylmethane and 0.2 grams of 2,6-dimethylhydroquinone. After 15 minutes of heating, the liquid homogeneous resin mass was then further processed as follows:

1. A portion of the resin was poured out onto a metal plate in order to cool it down more quickly. The yellow-brown resin obtained had the following properties: a softening point of 69° C., a viscosity at 150° C. of 120 mPas and a gel time at 160° C. of 34 minutes.
2. The remaining portion of the resin was poured into a 10×10×0.1 cm metal mold and cured for 2 hours at 160° C., 2 hours at 190° C. and 10 hours at 240° C. The polymer had a glass transition temperature in excess of 300° C. (according to DIN 53 445), its shear modulus at 335° C. was 900 N/mm$^2$ (DIN 53 445), and following 24 hours of storage in boiling water its absorption was 3.92 percent.

COMPARATIVE EXAMPLE

In a manner analogous to Example 1b, a bismaleimide resin is prepared from 0.2 grams of 2,6-dimethylhydroquinone, 80 grams 4,4'-bismaleimidodiphenylmethane and 20 grams of 4,4'-bis(O-propenylphenoxy)-diphenylsulfone (obtained from 1 mole equivalent of 4,4'-dichorodiphenylsulfone and 2 mole equivalents of o-allylphenol following the method of Example 1a). After curing, the shear modulus of the polymer at 295° C. wa) 900 N/mm$^2$ (DIN 53 445) and its water absorption was 4.27 percent.

EXAMPLE 2

(a) Preparing an Alkenylarene of Type A (X, Q=O; Y, Z=CO; l, n, m=1; R=Propenyl; p=1)

To 1100 ml N-methylpyrrolidone were added 219 grams (0.735 mole) of 1,4-bis(4-fluorobenzoyl)benzene, 197.6 grams (1.47 mole) of 2-allylphenol and 111.9 grams of potassium carbonate which were then reacted in a manner analogous to Example 1a. Obtained was 339 grams (88 percent) of a alkenylarene having a softening point of 142° C. $^1$H-NMR (270 MHz, D$_6$-DMSO): 1.82 (d, 6H), ca. 5.80 (m), 6.35–6.50 (m, 4H), 6.95–7.40 (m), 7.70–7.90 (m); double bond content, 93.8 percent of theory.

(b) Preparation of a Bismaleimide Resin System

In a manner analogous to Example 1b, a bismaleimide resin system is prepared from 80 grams of 4,4'-bismaleimidodiphenylmethane and 20 grams of the alkenylarene of 2a. Its softening point was 71° C.

EXAMPLE 3

(a) Preparation of 1,4-bis(2-[4-hydroxy-3-(propenyl)-phenyl]benzene (Type B Comonomer, X, Q=C(CH$_3$)$_2$; l, n=0; m=1; p=1; R$^1$=allyl)

To a solution containing 19.1 grams of 1,4-bis[2-(4-hydroxyphenyl)propyl]benzene and 4,1 grams of sodium hydroxide in 150 ml of n-propanol maintained at 100° C., was added dropwise over 30 minutes 9.77 ml of allyl chloride. The mixture was heated for six hours under reflux, and the sodium chloride precipitate was filtered off after cooling to room temperature. Following the removal of the solvent by distillation in vacuo, 21.2 grams (91 percent) of the corresponding O-allyl ether was obtained as a colorless solid; m.p. 64°–67° C. $^1$H-NMR (D$_6$-DMSO, 270 MHz): 1.60 (s, 12H), 4.43 (d, 4H), 5.20 (d, 2H), 5.34 (d, 2H), 5.98 (m, 2H), 6.78 (d, 4H) 7.08 (s, 4H), 7.12 (d, 4H).

(b) Claisen Rearrangement of the O-allyl Ether 21.2 Grams of the O-allyl ether was then heated for three hours at 200° C. under a vacuum of about 1 mm. Obtained was 20.5 grams (97 percent) of 1,4-bis(2-[4-hydroxy-3-(propenyl)phenyl]benzene) as a highly viscous oil. $^1$H-NMR (D6-DMSO, 270 MHz): 1.56 (s, 12H), 3.23 (d, 4H), 4.95 (m, 4H), 5.90 (m, 2H), 6.65–6.90 (m, 6H), 7.05 (s, 4H), 9.02 (d, 2H).

(c) Reaction with 4,4'-bismaleimidodiphenylmethane.

In a stirred reaction vessel maintained at a temperature of 150° C. were melted together 60 grams of 4,4'-bismaleimidodiphenylmethane, 15 grams of the allylphenol from Example 3b, and 0.2 grams of hydroquinone. The liquid resin mass was further processed as follows after 25 minutes of heating.

A portion of the resin was poured out onto a metal plate for the purpose of rapid cooling. The resin obtained had a softening point of 44° C. (Koflerbank); its gel time at 160° C. was 32 minutes.

The remaining portion of the resin was poured into 30×20×0.4 and 30×30×0.1 cm metal molds and cured for two hours at 160° C., two hours at 190° C. and eight hours at 240° C. The polymer had a glass transition temperature in excess of 300° C. (DIN 53 445); its impact resistance was 18.3 kJm/$^2$ (DIN 53 453). After 24 hours of storage in boiling water, the water absorption was 3.32 percent.

COMPARATIVE EXAMPLE

In a manner analogous to Example 3c, and in accordance with the teaching of U.S. Pat. No. 4,100,140, a bismaleinimide resin system was prepared from 0.2 grams of hydroquinone, 15 grams o,o,-diallylbisphenol A and 60 grams of 4,4'-bismaleimidodiphenylmethane. Following cure, its water absorption was 4.77 percent, and its impact resistance 9.4 kJm$^2$ (DIN 53 453).

EXAMPLE 4

(a) Preparation of an Alkenylarene of Type B (X, Q=O; Y=CO; l, m=1; n=0; p=1; R'=Allyl)

The following were reacted in a manner analogous to that of Example 3a: 199 grams (0.5 mole) of 4,4'-bis(4-hydroxyphenoxy)benzophenone, 97.6 ml (1.2 mole) of allyl chloride, and 43.8 grams of sodium hydroxide. The solvent consisted of 650 ml of n-propanol. Obtained was 213 grams (89 percent) of the O-allyl ether; its Claissen-rearrangement in a manner similar to that of Example 3b provided 211 grams (88 percent of an alkenylarene.

(v) Preparation of a Bismaleimide Resin System

In a manner analogous to Example 1b, a resin was prepared from 160 grams of 4,4'-bismaleimidodiphenylmethane, 40 grams of the alkenylarene of 4a, 0.4 grams of dimethylhydroquinone and 0.2 grams of triphenylphosphine. The resin had a softening point of 72° C., a gel time at 160° C. of 40 minutes and a glass transition temperature of 305° C.

The embodiments of the invention in which an exclusive privilege or property is claimed are defined as follows:

1. A heat-curable resin system, comprising a bismaleimide monomer and a comonomer selected from the group consisting of:

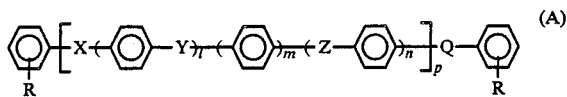

wherein X, Y, Z, and Q are selected from the group consisting of —CO—, —O—, —SO$_2$—, —CH$_2$O—, and —C(R')$_2$— wherein R' is a C$_1$–C$_6$ alkyl radical; wherein l and n may be 0 or 1; wherein m may be 1 or 2;

wherein p can be a whole number between 1 and 10;

wherein

r is an aryl nucleus, which may be substituted with C$_1$–C$_6$ alkyl, alkoxy, aryl, halogen, or nitro groups;

wherein R is an alkenyl or alkynyl radical containing from 2 to about 6 carbon atoms; and wherein the comonomer A contains at least 5 aryl nuclei; and

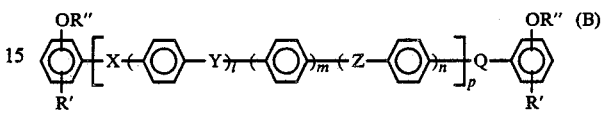

wherein the symbols have the same meaning as in (A) and wherein R' and R" are alkenyl, alkynyl, or H, provided that when R' is alkenyl or alkynyl, R" is H, and when R" is alkenyl or alkynyl, R' is H.

2. The heat-curable resin system of claim 1 wherein l, m, and p are 1 and n is 0.

3. The heat-curable resin system of claim 1 wherein m is 2.

4. The heat-curable resin system of claim 1 wherein X, Y, Z, and Q are selected from the group consisting of —C(CH$_3$)$_3$—, —O—, and —CO—.

5. A fiber reinforced, heat-curable prepreg, comprising
    (a) reinforcing fibers selected from the group consisting of glass, carbon, aramid, and polyarylene polymers containing interspersed ether, ketone, sulfone, or isopropylidene groups; and
    (b) the heat curable resin of claim 1.

* * * * *

UNITED STATES PATENT AND TRADEMARK OFFICE
CERTIFICATE OF CORRECTION

PATENT NO.  : 4,873,284

DATED       : Oct. 10, 1989

INVENTOR(S) : Peter Ittemann and Philipp Eisenbarth

It is certified that error appears in the above-identified patent and that said Letters Patent is hereby corrected as shown below:

In claim 1, column 10, second line should read as follows:
"is an aryl nucleus, which may be substituted with".

Claim 4, column 10, third line should read as follows:
"$-C(CH_3)_2-$, $-O-$, and $-CO-$.".

Signed and Sealed this

Fourth Day of September, 1990

Attest:

HARRY F. MANBECK, JR.

Attesting Officer

Commissioner of Patents and Trademarks